(12) United States Patent
Rowe

(10) Patent No.: US 8,424,561 B1
(45) Date of Patent: Apr. 23, 2013

(54) PRESSURE REGULATOR

(76) Inventor: Carroll G. Rowe, Washington, AR (US)

( * ) Notice: Subject to any disclaimer, the term of this patent is extended or adjusted under 35 U.S.C. 154(b) by 416 days.

(21) Appl. No.: 12/705,159

(22) Filed: Feb. 12, 2010

Related U.S. Application Data

(60) Provisional application No. 61/155,245, filed on Feb. 25, 2009, provisional application No. 61/171,679, filed on Apr. 22, 2009.

(51) Int. Cl.
*F16K 31/12* (2006.01)
*F16K 31/36* (2006.01)

(52) U.S. Cl.
USPC . 137/508; 137/505; 137/505.25; 137/505.28; 137/488; 251/63.5

(58) Field of Classification Search ............ 137/488, 137/487.5, 495, 505.14, 492, 505.28, 505.25, 137/508, 505; 251/62–63.6
See application file for complete search history.

(56) References Cited

U.S. PATENT DOCUMENTS

| | | | |
|---|---|---|---|
| 3,367,360 A * | 2/1968 | Hickerson | 137/505.22 |
| 3,454,041 A * | 7/1969 | Masson | 137/505.25 |
| 4,027,923 A | 6/1977 | Saito | |
| 4,431,020 A * | 2/1984 | Kowalski | 137/110 |
| 4,874,011 A | 10/1989 | Canzano et al. | |
| 4,887,638 A * | 12/1989 | Hellquist et al. | 137/505.13 |
| 4,961,441 A * | 10/1990 | Salter | 137/487.5 |
| 5,255,747 A * | 10/1993 | Teske et al. | 169/15 |
| 5,411,100 A * | 5/1995 | Laskaris et al. | 169/14 |
| 5,765,644 A | 6/1998 | Arvidson et al. | |
| 6,357,532 B1 * | 3/2002 | Laskaris et al. | 169/43 |
| 6,363,959 B1 | 4/2002 | Ollivier | |
| 6,584,999 B2 * | 7/2003 | Inayama et al. | 137/487.5 |
| 7,264,018 B2 | 9/2007 | Massengale et al. | |
| 7,322,372 B2 | 1/2008 | Trapp | |
| 2008/0035201 A1 | 2/2008 | Roberts | |

OTHER PUBLICATIONS

"Auto Fill & Fill Thief," product information distributed by Hale Products, Inc., accessed at www.haleproducts.com, Jan. 2010.
CAFSPro User Operation Manual, Section 4A.1 entitled "Water Supply," accessed at www.haleproducts.com, Jan. 2010.

* cited by examiner

*Primary Examiner* — Stephen M Hepperle
*Assistant Examiner* — Seth Faulb
(74) *Attorney, Agent, or Firm* — J. Charles Dougherty

(57) ABSTRACT

A pressure regulator is capable of automatically regulating the inlet water pressure to a compressed air foam system (CAFS), thereby allowing direct connection between a high-pressure water source, such as a hydrant, and the CAFS. The pressure regulator includes an inlet, a valve that regulates flow from the inlet, and an annular piston that circumscribes the inlet and which is linked to the valve. The relative area of the inlet and the piston determine the maximum pressure that may be attained at the CAFS water inlet, due to pressure on the piston forcing the valve closed.

20 Claims, 1 Drawing Sheet

PRESSURE REGULATOR

CROSS-REFERENCE TO RELATED APPLICATIONS

The present application claims the benefit of U.S. provisional patent application Nos. 61/155,245, filed on Feb. 25, 2009, and 61/171,679, filed on Apr. 22, 2009. The entire disclosure of each such provisional patent application is hereby fully incorporated by reference.

STATEMENT REGARDING FEDERALLY SPONSORED RESEARCH OR DEVELOPMENT

Not applicable.

BACKGROUND OF THE INVENTION

Compressed air foam systems (CAFS) have been used in firefighting for quite some time. The original CAFS developments were made by the U.S. Navy during the 1940's as a method to fight fires on board ships. In its most basic form, CAFS is simply a means for mixing air and water with a surfactant in order to produce a water-based foam that is used to extinguish fires. CAFS provides quicker "knockdown" against potent fires, deeper penetration of fuels, and gives firefighters the advantage of making their initial attack against a fire from a significantly greater distance than with a traditional water stream or fog pattern. The bubble structure allows for greater expansion of delivered water surface area, allowing for greater heat reduction compared to equal amounts of plain water. Foam blankets allow for pre-treatment of fuels that are not already involved in the fire, and have less adverse impact on property, as well as helping to prevent damage to evidence used for fire investigations. In fact, some studies have indicated that CAFS increases the effectiveness of water as an extinguishing agent by approximately a factor of five. CAFS may be particularly valuable for rural fire departments, because the use of foam reduces the amount of water required to extinguish a fire, and rural departments are often quite limited in the amount of water that they have available at any particular fire.

A persistent challenge with CAFS design is the maintenance of a correct balance between incoming water and air pressure. If these pressures are not correctly balanced, a low-quality foam or no foam at all may result. Most firefighting vehicles equipped with CAFS use a centrifugal water pump to provide "boost" water pressure control, and a rotary screw air compressor to provide air pressure. Both of these devices are driven by the vehicle's engine through a transmission gear box. It will be seen from this arrangement then that the vehicle's engine rotations per minute (RPMs) will control the pressure of the incoming water and air flows. A balancing valve is added with feedback controls in order to maintain the appropriate water and air pressure ratio. By automatically adjusting engine RPMs in response to the balancing valve feedback, a high-quality foam output may be achieved. A number of manufactures provide such systems as described above, including Hale Products Inc. of Conshohocken, Pa.

The existing commercial CAFS are designed to be used in conjunction with a low-pressure water source. It is generally accepted in the industry that the water source for CAFS should be at about 20 pounds per square inch (psi) or less for satisfactory performance at the water pump intake. Thus the typical source of water for a CAFS is a water tank on board the CAFS vehicle or other on-site firefighting vehicle. Such systems cannot be effectively employed with direct feed from a high-pressure source, such as a typical fire hydrant. The reason for this is that the centrifugal pump used to create water pressure in such systems boosts the incoming water pressure, and the result is that the vehicle's engine RPM necessary for satisfactory water pressure will be insufficient to produce the required volume of air for production of satisfactory CAFS. Thus if the incoming water pressure from the water source is higher than approximately 20 psi, the system would be incapable of producing a properly balanced, high-quality firefighting foam because there is no means of lowering the incoming water pressure with a centrifugal pump.

One means to connect existing commercial CAFS to a high pressure source is to provide a relief valve to bleed off incoming water pressure. This is suggested, for example, in the User Operation Manual for Hale's "CAFSPro" system. But the result of using a bleed-off relief valve is wasted water, which may be a particularly critical concern for rural fire departments, where utilization of all available water may be essential for many firefighting efforts. Otherwise, as the CAFSPro system User Operation Manual explains, "[i]f incoming water pressure is excessively high, it may not be possible to maintain engine RPM and desired pressure." Another means is to attempt to gate the incoming water stream to match the required volume, but this is not an acceptable means, for if a nozzle at any discharge is closed or opened it adversely affects the system pressure, so the pump will either be starved for water and have insufficient volume and pressure, or a pressure spike will occur that is above an acceptable threshold before the pump operator can adjust the incoming flow.

To address these limitations of existing commercial CAFS, firefighters today typically feed water from a hydrant source into a CAFS by connecting the hydrant to a vehicle water tank, and then connecting the vehicle water tank to the CAFS. But this approach requires that a firefighter manually open and close valves continuously during operation in order to maintain a proper level in the vehicle water tank, or that an automatic system be installed that requires a series of valves with level sensors and actuators. Commercial automated systems for this purpose include Hale's "AutoFill" tank fill valve. The manual approach to water tank level management ties up a firefighter that could otherwise perform other critical tasks, which is an especially important issue for rural fire departments with limited manpower. The automated approach requires the addition of expensive equipment, which again is a particular concern for rural fire departments since the price of such equipment may not be within their limited equipment budgets. In addition, automated equipment of this type includes many moving parts, which requires regular maintenance in order to reduce the likelihood of a critical failure in the field. What is desired then is a simple, inexpensive, reliable means for limiting the incoming water pressure from a high-pressure source, such as a hydrant, in order that it may be reliably used with CAFS to produce high-quality foam.

BRIEF SUMMARY OF THE INVENTION

The present invention is directed to a pressure regulator that is designed for installation between a pressurized water source and the pump intake portion of a CAFS, although it will be apparent to those skilled in the art that the invention has other uses as well. In a CAFS, the pressure regulator automatically reduces the incoming pressure from a high-pressure source, such as a hydrant, so that the high-pressure water source may be fed directly into the water pump intake of a CAFS while still producing high-quality foam. It is not necessary to first route the water into a vehicle water tank or to use a bleed-off relief valve. The pressure regulator is also capable, however, of operating with lower-pressure water sources as desired, since it does not significantly impede the flow of water when the incoming water pressure is at or below an acceptable level for producing foam with a CAFS. Thus by employing the present invention, the firefighter may use whatever source of water is available and desired, without concern about the quality of resulting foam from the CAFS.

In one aspect, the invention is a pressure regulator, comprising an inlet comprising an inlet opening; a valve configured to seat at said inlet opening and thereby close said inlet; an annular piston circumscribing said inlet, wherein said annular piston comprises a piston surface, and wherein the area of said piston surface is greater than the area of said inlet opening; and at least one connecting link connecting said valve to said piston whereby axial movement of said piston causes a corresponding axial movement of said valve whereby said valve may open and close.

In another aspect, the invention is a CAFS pressure regulator, comprising: a foam generator; a discharge chamber connected to said foam generator; a liquid inlet comprising an inlet opening in hydraulic communication with said discharge chamber; a valve configured to seat at said inlet opening and thereby open and close the flow of liquid between said inlet and said discharge chamber; an annular piston circumscribing said inlet, wherein said annular piston comprises a piston surface, and wherein the area of said piston surface is greater than the area of said inlet opening; and at least one connecting link connecting said valve to said piston.

It is therefore an object of the present invention to provide a simple, inexpensive, reliable pressure regulator that allows a high-pressure water source to directly feed a CAFS system while still producing high-quality foam, while also not impeding water flow from a lower-pressure water source. These and other features, objects and advantages of the present invention will become better understood from consideration of the following detailed description of the preferred embodiments, in conjunction with the drawings as described.

DETAILED DESCRIPTION OF THE PREFERRED EMBODIMENTS

Figure 1:
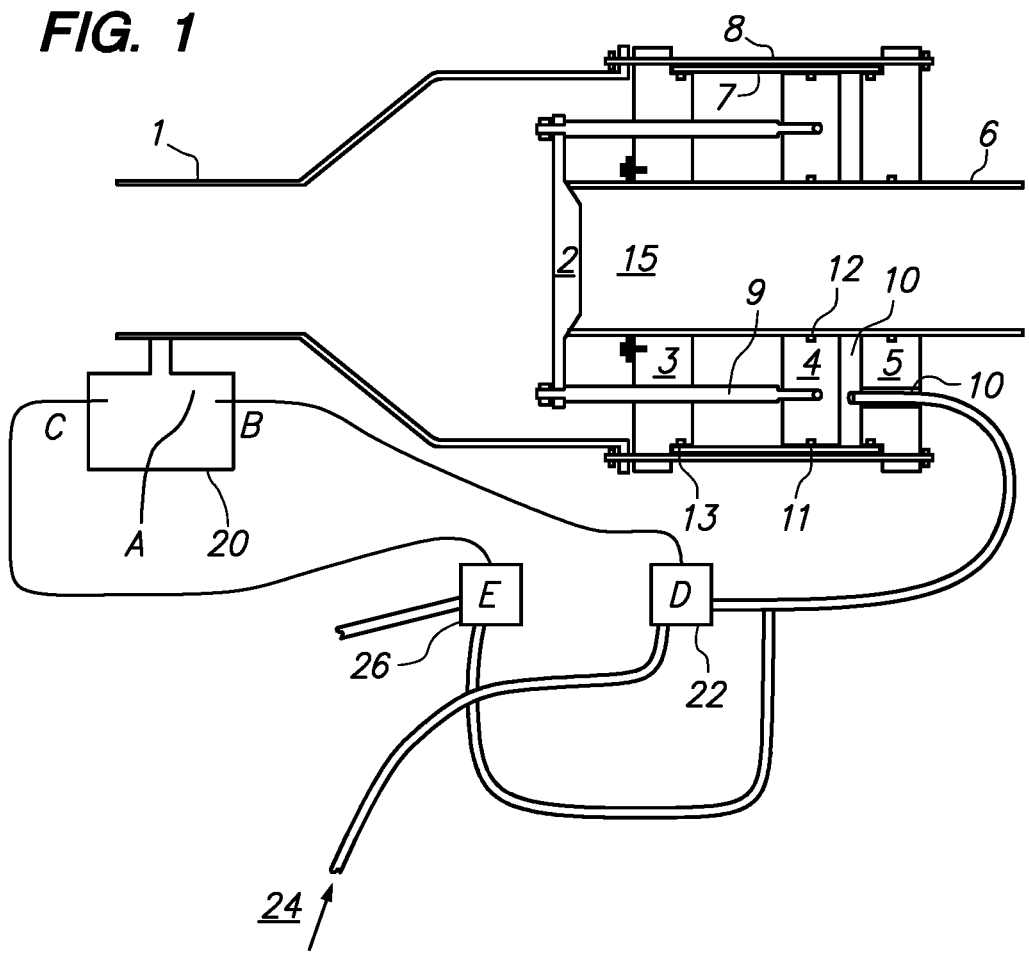
FIG. 1 is a side elevational view in cut-away of a preferred embodiment of the present invention.
Figure 2:
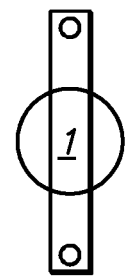
FIG. 2 is a top plan view of a valve according to a preferred embodiment of the present invention.
Figure 3:
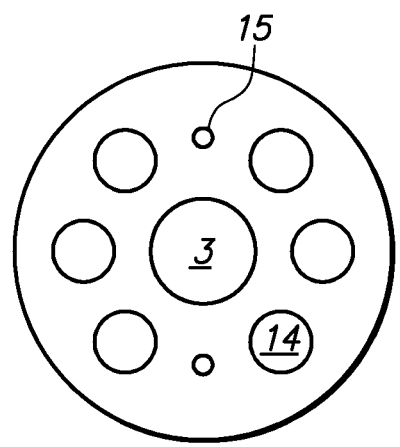
FIG. 3 is a top plan view of a guide plate according to a preferred embodiment of the present invention.

With reference now to FIGS. 1-3, a preferred embodiment of the present invention may be described. Liquid, preferably water, enters the regulator from a hydrant or other high-pressure source at inlet 6. Discharge chamber 1 may be preferably connected to a CAFS (not shown), many types of which are known in the art and fall within the scope of the invention. Regulating the flow of liquid between inlet 6 and discharge chamber 1 is valve 2. In the closed position, as shown in FIG. 1, valve 2 completely blocks the flow of liquid out of inlet 6 by seating itself at the outflow end of inlet 6. When valve 2 is open, however, liquid may flow around the periphery of valve 2 from inlet 6 into discharge chamber 1. From discharge chamber 1, liquid may enter the CAFS system where it is mixed with air and surfactant to produce foam in a manner as known in the art.

Connecting links 9 attach valve 2 to piston 4. Two connecting links 9 are shown in the cut-away view of FIG. 1, but any number could be used in alternative embodiments. Piston 4 is annular in shape and positioned circumferentially around inlet 6, such that it may slide co-axially with respect to inlet 6. Guide plate 3, also generally annular in shape as shown in FIG. 3, provides support for connecting links 9, since connecting links 9 pass through guide holes 15. Guide holes 15 are preferably sized to snugly fit connecting links 9. Guide plate 3 also provides a stop for the movement of piston 4 in the direction of discharge chamber 1. Guide plate 3 further includes passages 14, shown in FIG. 3. Passages 14 allow liquid to flow through guide plate 3, the purpose of which will be explained further below. Although shown in the form of several circular openings in the figures, passages 14 could be of any shape, size, or number.

End plate 5, also annular in shape, fits around inlet 6 beneath piston 4. Vent 10 provides a means for venting or controlling the pressure formed between piston 4 and end plate 5. While in certain embodiments vent 10 may simply be open to the atmosphere, in other embodiments, as illustrated in FIG. 1, vent 10 is connected to a pressure control mechanism as will be described below. Cylinder barrel 7 provides a cylindrical wall between guide 3 and end plate 5, thereby forming a cylindrical chamber around inlet 6, with cylinder barrel 7 being clamped into position between guide 3 and end plate 5 by draw bolts 8. Outer seal 11 and inner seal 12 are preferably formed of a resilient material, such as rubber, and positioned in appropriately sized grooves in the sides of piston 4, in order to provide a watertight seal between the outer wall of piston 4 and cylinder barrel 7, and the inner wall of piston 4 and inlet 6, respectively. Guide seal 13, preferably also formed of a resilient material, may be positioned in an appropriately sized groove in guide plate 3 to provide a watertight seal between guide 3 and cylinder barrel 7. It may be seen that with such an arrangement, liquid may enter at inlet 6, and exit the device at discharge chamber 1, but otherwise may not exit the device.

Pressure switch 20 is preferably a single-pole, double-throw (SPDT), or "three-way" switch, which may be of any of the various known types of such switches that respond directly or indirectly to a measurement of pressure. Pressure switch 20 is in communication with discharge chamber 1 such that it may sense the pressure in discharge chamber 1. In the embodiment illustrated in FIG. 1, if a selected threshold pressure is reached, switch pole A engages contact B, which through an electrical connection with solenoid 22 energizes solenoid 22. This opens the connection between pressurized air source 24 and vent 10, thereby applying air pressure to the rearward side of piston 4. When the pressure in discharge chamber 1 rises to the threshold pressure, switch pole A disengages with contact B, which causes a signal to be send to solenoid 22 that de-energizes solenoid 22. As a result, the flow of air from pressurized air source 24 to vent 10 is shut off. In addition, the rise in pressure to threshold causes switch pole A to engage with contact C, which opens vent valve 26. Vent valve 26 provides a vent path to atmosphere, thereby lowering the pressure at the rearward side of piston 4 to atmospheric pressure. It may be noted that in alternative embodiments within the scope of the invention, various other switches and other known means could be employed to control the pressure applied at the rearward side of piston 4. Such means include, by way of example and not limitation, a pressure transducer and electronic controller, microcontroller, or microcomputer. The use of a controller or like mechanism would offer the potential advantage of dynamic adjustment of threshold pressure.

The structure of the preferred embodiment of the present invention having been described, the operation of the preferred embodiment may now be described as follows, again with reference to FIGS. 1-3. With liquid entering at inlet 6, the pressure of the liquid will force valve 2 to open. The opening of valve 2 allows liquid to exit inlet 6 around the periphery of valve 2 and flow out into discharge chamber 1. It may be seen that the pressure in discharge chamber 1 will rise as liquid continues to flow from inlet 6 into discharge chamber 1. Liquid will also flow through passages 14 in guide supports 3, filling the void between guide plate 3 and piston 4, and thus exerting pressure on piston 4.

Because of the connection between piston 4 and valve 2 due to connecting links 9, the pressure exerted on piston 4 urges valve 2 towards the closed position. The pressure caused by liquid within discharge chamber 1 on piston 4 thus forces valve 2 towards a closed position, while the pressure of liquid within inlet 6 forces valve 2 towards an open position. The total force on valve 2 is the difference between these two countervailing forces. Since pressure is defined as force applied to a surface per unit area, it may be seen that the total force exerted on valve 2 is proportional to the ratio of the area of the outer opening of liquid inlet 6 to the surface area of piston 4. The pressure at which the regulator will thus close valve 2, and thereby prevent further flow of liquid from inlet 6, is determined by the ratio of the area of the outer opening of liquid inlet 6 to the surface area of piston 4. For example, if the surface area of piston 4 is six times greater than the area of the opening of liquid inlet 6, then valve 2 will begin to close once the pressure within discharge chamber 1 rises to about one-sixth the pressure at liquid inlet 6, less losses due to friction and assuming that vent valve 26 is open. In this way, the design of the pressure regulator—and in particular the design of the ratio of these two areas—determines the maximum pressure of liquid being directed into the CAFS system from discharge chamber 1.

In a preferred embodiment, inlet 6 has an inner diameter (ID) of 2 inches and an outer diameter (OD) of 2.5 inches. Further in the preferred embodiment, piston 4 has an outer diameter of 7 inches. Thus the area of the face of piston 4, it may be seen from simple geometry, is about 34 square inches. The operating area of valve 2, based on the size of inlet 6, is about 3.1 inches. Thus it may be seen that the ratio of their areas is about 11 to 1. As a result, incoming pressure at inlet 6 will be reduced by a factor of about 11 in this embodiment, again assuming that vent valve 26 is open, since this is the point at which the forces at inlet 6 and on the face of piston 4 are equal.

By applying pressure at vent 10 with vent valve 26 closed by switch 20, it may be seen that the ratio of the pressure reduction may be changed. In particular, incoming pressure at inlet 6 may be reduced at discharge chamber 1 by any desired factor up to the factor applicable in the case where vent valve 26 is open, that is, the back of piston 4 is open to the atmosphere. In the above example, this means that by operation of pressure switch 20, the pressure at inlet 6 may be reduced at discharge chamber 1 by any factor up to about 11 to 1. It will be well understood by those in the art that changing the ratio of areas between inlet 6 and piston 4 will alter this upper threshold ratio factor, and thus the upper threshold ratio can be any value desired simply by designing inlet 6 and piston 4 to be of appropriate relative areas.

It may also be noted that there is, due to the nature of the pressure regulator design, a volume change of liquid in discharge chamber 1 during operation of the pressure regulator. As valve 2 is moved towards its seat at inlet 6 to lessen or completely close off the flow of liquid into discharge chamber 1, the total volume within discharge chamber 1 increases until equilibrium of pressure is achieved or valve 2 is closed. Since liquid/gas pressure within a chamber is inversely proportional to volume, the result of this increase in volume in discharge chamber 1 is a cushioning effect, which eliminates or lessens the "water hammer" at inlet 6 and pressure spikes within discharge chamber 1, compared to prior art systems.

While the preferred embodiment has been described with reference to firefighting equipment, it may be understood by those skilled in the art that the invention is not so limited. The invention finds application wherever it is desirable to control the output pressure of a liquid flow.

As used herein, "comprising" is synonymous with "including," "containing," or "characterized by," and is inclusive or open-ended and does not exclude additional, unrecited elements or method steps. As used herein, "consisting of" excludes any element, step, or ingredients not specified in the claim element. As used herein, "consisting essentially of" does not exclude materials or steps that do not materially affect the basic and novel characteristics of the claim. Any recitation herein of the term "comprising", particularly in a description of components of a composition or in a description of elements of a device, is understood to encompass those compositions and methods consisting essentially of and consisting of the recited components or elements. The invention illustratively described herein suitably may be practiced in the absence of any element or elements, limitation or limitations which is not specifically disclosed herein.

The terms and expressions which have been employed are used as terms of description and not of limitation, and there is no intention in the use of such terms and expressions of excluding any equivalents of the features shown and described or portions thereof, but it is recognized that various modifications are possible within the scope of the invention claimed. Thus, it should be understood that although the present invention has been specifically disclosed by preferred embodiments and optional features, modification and variation of the concepts herein disclosed may be resorted to by those skilled in the art, and that such modifications and variations are considered to be within the scope of this invention as defined by the appended claims. Thus, additional embodiments are within the scope of the invention and within the following claims.

In general the terms and phrases used herein have their art-recognized meaning, which can be found by reference to standard texts, journal references and contexts known to those skilled in the art. The preceding definitions are provided to clarify their specific use in the context of the invention. All references cited herein are hereby incorporated by reference to the extent that there is no inconsistency with the disclosure of this specification.

The present invention has been described with reference to certain preferred and alternative embodiments that are intended to be exemplary only and not limiting to the full scope of the present invention as set forth in the appended claims.

The invention claimed is:

1. A pressure regulator, comprising:
   (a) an inlet comprising an inlet opening;
   (b) a valve configured to seat against said inlet opening and thereby close said inlet;
   (c) an annular piston circumscribing said inlet and axially movable with respect to said inlet, wherein said annular piston comprises a piston surface, and wherein the area of said piston surface is greater than the area of said inlet opening;

(d) at least one connecting link connecting said valve to said piston whereby axial movement of said piston causes a corresponding axial movement of said valve whereby said valve may open and close; and (e) an annular guide plate circumscribing said inlet and positioned between said valve and said piston, wherein said guide plate comprises at least one guide hole sized to receive the connecting link therethrough whereby the connecting link may freely move forward and rearward with respect to the annular guide plate along a longitudinal axis of the inlet, and further wherein the guide plate comprises at least one liquid passage whereby liquid may freely move through the guide plate.

2. The pressure regulator of claim 1, further comprising a discharge chamber mounted to said guide plate.

3. The pressure regulator of claim 1, further comprising a discharge chamber circumscribing said inlet opening.

4. The pressure regulator of claim 3, wherein said pressure regulator is configured to increase a volume within said discharge chamber in direct proportion to a volume of liquid introduced as said valve closes said inlet.

5. The pressure regulator of claim 3, further comprising an annular end plate circumscribing said inlet and positioned opposite said piston from said guide plate.

6. The pressure regulator of claim 5, further comprising a cylinder barrel connecting said guide plate and said end plate, wherein said piston forms a watertight seal between said inlet and said cylinder barrel.

7. The pressure regulator of claim 6, further comprising an annular inner piston seal between said inlet and said piston, and an annular outer piston seal between said piston and said cylinder barrel.

8. The pressure regulator of claim 6, further comprising at least one draw bolt connecting said guide plate and said end plate.

9. The pressure regulator of claim 5, wherein said end plate further comprises a vent.

10. The pressure regulator of claim 9, further comprising:
    (a) a pressure switch in communication with said discharge chamber;
    (b) a pressurized air source;
    (c) an air passageway connected to said vent; and
    (d) a pressurized air valve in communication with said switch, said pressurized air source, and said vent, wherein said valve is opened in response to said switch being in a first position, whereby air from said air source may pass through said air passageway into said vent, and said pressurized air valve is closed in response to said switch being in a second position, whereby air from said air source is blocked from passing through said air passageway into said vent.

11. The pressure regulator of claim 10, further comprising a vent valve in communication with said pressure switch and said air passageway, whereby said vent valve is closed in response to said pressure switch being in said first position, and said vent valve is opened in response to said switch being in said second position.

12. A compressed air foam system (CAFS) pressure regulator, comprising:
    (a) a foam generator;
    (b) a discharge chamber connected to said foam generator;
    (c) a liquid inlet comprising an inlet opening in hydraulic communication with said discharge chamber;
    (d) a valve configured to seat against said inlet opening and thereby open and close the flow of liquid between said inlet and said discharge chamber;
    (e) an annular piston circumscribing said inlet and axially movable with respect to said inlet, wherein said annular piston comprises a piston surface, and wherein the area of said piston surface is greater than the area of said inlet opening;
    (f) at least one connecting link connecting said valve to said piston; and
    (g) an annular guide plate circumscribing said inlet and positioned between said valve and said piston, wherein said guide plate comprises at least one guide hole sized to receive the connecting link therethrough whereby the connecting link may freely move forward and rearward with respect to the annular guide plate along a longitudinal axis of the inlet, and further wherein the guide plate comprises at least one liquid passage whereby liquid may freely move through the guide plate.

13. The CAFS pressure regulator of claim 12, wherein said CAFS pressure regulator is configured to increase a volume within said discharge chamber in direct proportion to a volume of liquid introduced as said valve closes said inlet.

14. The CAFS pressure regulator of claim 12, further comprising an annular end plate circumscribing said inlet and positioned opposite said piston from said guide plate.

15. The CAFS pressure regulator of claim 14, wherein said end plate further comprises a vent.

16. The CAFS pressure regulator of claim 14, further comprising a cylinder barrel connecting said guide plate and said end plate, wherein said piston forms a watertight seal between said inlet and said cylinder barrel.

17. The CAFS pressure regulator of claim 16, further comprising an annular inner piston seal between said inlet and said piston, and an annular outer piston seal between said piston and said cylinder barrel.

18. The CAFS pressure regulator of claim 16, further comprising at least one draw bolt connecting said guide plate and said end plate.

19. The CAFS pressure regulator of claim 16, further comprising:
    (a) a pressure switch in communication with said discharge chamber;
    (b) a pressurized air source;
    (c) an air passageway connected to said vent; and
    (d) a pressurized air valve in communication with said switch, said pressurized air source, and said vent, wherein said valve is opened in response to said switch being in a first position, whereby air from said air source may pass through said air passageway into said vent, and said pressurized air valve is closed in response to said switch being in a second position, whereby air from said air source is blocked from passing through said air passageway into said vent.

20. The CAFS pressure regulator of claim 19, further comprising a vent valve in communication with said pressure switch and said air passageway, whereby said vent valve is closed in response to said pressure switch being in said first position, and said vent valve is opened in response to said switch being in said second position.

* * * * *